United States Patent
Bergen et al.

[11] Patent Number: 5,693,392
[45] Date of Patent: Dec. 2, 1997

[54] UNCOATED AIRBAG FABRIC

[75] Inventors: Eberhard Bergen; Remi Lalonde, both of Emmenbrücke; Bruno Lang, Ballwil, all of Switzerland

[73] Assignee: Rhone-Poulenc Viscosuisse S.A., Emmenbrucke, Switzerland

[21] Appl. No.: 793,147

[22] PCT Filed: Aug. 15, 1995

[86] PCT No.: PCT/CH95/00180

§ 371 Date: Feb. 6, 1997

§ 102(e) Date: Feb. 6, 1997

[87] PCT Pub. No.: WO96/05985

PCT Pub. Date: Feb. 29, 1996

[30] Foreign Application Priority Data

Aug. 25, 1994 [CH] Switzerland ............... WO 96/05985

[51] Int. Cl.$^6$ ............................................. B60R 21/20
[52] U.S. Cl. ................... 428/36.1; 139/421; 280/743.1; 442/184

[58] Field of Search ............... 428/36.1; 280/743.1; 442/182, 184; 139/421

[56] References Cited

FOREIGN PATENT DOCUMENTS

| | | |
|---|---|---|
| 0416483A1 | 9/1990 | European Pat. Off. . |
| 0436950A2 | 12/1990 | European Pat. Off. . |
| 0436950B1 | 12/1990 | European Pat. Off. . |
| 0442373A1 | 2/1991 | European Pat. Off. . |
| 0501295A1 | 2/1992 | European Pat. Off. . |
| 0509399A1 | 4/1992 | European Pat. Off. . |

*Primary Examiner*—James J. Bell
*Attorney, Agent, or Firm*—Michael J. Striker

[57] ABSTRACT

An uncoated fabric with linen or ripstop binding of a polyamide filament yarn with a fibril titer of 1.5 to 7 dtex, a strength of 50 to 80 cN/tex and an elongation of 15 to 30%, for producing an impact gas bag (airbag), characterized in that the fabric simultaneously has an air permeability of <1/dm$^2$/min, a residual boiling shrinkage of <2%, and a tear propagation strength in warp and weft of >110 N.

3 Claims, No Drawings

UNCOATED AIRBAG FABRIC

The invention relates to an uncoated fabric with linen or ripstop binding of a polyamide filament yarn with a fibril titer of 1.5 to 7 dtex, a strength of 50 to 80 cN/tex and an elongation of 15 to 30%, for producing an impact gas bag (airbag), and to a process for producing it.

Uncoated fabrics of polyamide 6.6 are known (European Patent Application EP-A 0 436 950). To attain low air permeability, it is evidently necessary for use in the fabric to use a filament with a hot air shrinkage of 6 to 15%, measured at 160° C. The grey cloth is then shock-shrunk in an aqueous bath in a temperature range between 60° and 140° C. By the known process, with a known linen binding, however, air permeabilities of only 3 l/dm²/min and more at 500 Pa are attained. Such intrinsically low air permeabilities, which are demanded by airbag system manufacturers, are adequate for many applications; because of the high thermal shrinkage and the attendant high windup tension, however, the yarns required for this can be made by the stretch-spinning process only with great difficulty, if at all. When yarns with high shrinkage (over 6%) are used, special precautions must be taken in their manufacture so as to fix the thermal shrinkage by severe, uniform cooling, without causing differences in tension. Either the stretching must be done by yarn sheet with yarn-tension-controlled cooling, or it is typically done by cop winding with vertical single-yarn stretching. In practice, such yarns require rewinding from cop to cylinder or in fact require yarn sheet stretching with tension-controlled cooling.

The object of the invention is to furnish a fabric that has an air permeability which is nearly equivalent to that of a coated fabric and that can be manufactured in a simple and thus also economical way. The air bag fabric should have a very low air permeability, a high dimensional stability, and a high tear propagation strength.

Another object is to find a replacement of uncoated fabric instead of coated fabric for producing an air bag fabric. Not only is coating a complicated process step that increases the expense, but the resultant fabric also has a foldability that is poorer by approximately 10% to 15%, and has a large packing volume.

The object according to the invention is attained in that the fabric simultaneously has an air permeability of <1/dm²/min, a residual boiling shrinkage of <2%, and a tear propagation strength in warp and weft of >110N. It is expedient if the air permeability is from 1 to 3 l/dm²/min.

It is expedient if the fabric, in the 5 cm fabric strip test, has a tear strength of >2500N. This assures the integrity of the fabric in the airbag upon impact.

For the process for producing the uncoated fabric, a polyamide multifilament yarn produced in a stretch-spinning process with a fibril titer of 1.5 to 7 dtex has proved especially advantageous. It is particular advantageous if the polyamide filament has a hot air shrinkage of <6%, measured at 160° C. in air and at a bias of 0.5 cN/tex, and a minimum shrinkage force of 0.20 cN/tex, and is later treated in fabric form in a closed container at a temperature of 80° to 160° C. and a relative humidity of 90 to 100%.

Surprisingly, it has been found that even with a reduced-shrinkage starting material, very low air permeabilities are attainable. Air permeabilities above 3 l/dm²/min are moreover only limitedly tolerable even for modern tripping systems having fewer and finer particles; air permeabilities below 3 l/dm²/min and preferably below 2.5 l/dm²/min and less have proved to be excellent for air bag fabric.

The air permeability of the fabric is measured by DIN 53887 at an air pressure of 500 Pa.

The thermal shrinkage and the boiling shrinkage were measured by DIN 53866; in the thermal shrinkage, the air temperature was 160° C. and the bias was 0.5 cN/tex. The tear propagation strength was measured by DIN 53859 T2; the tear strength and elongation to rupture were measured by DIN 83835.

As the starting material, a low-fluff polyamide filament yarn, produced in a stretch-spinning process with an individual titer range of 1.5 to 7 dtex and especially 3 dtex or finer, is used. It has proved to be especially expedient that the polyamide filament has a hot air shrinkage of <6% and in particular <5.5%, measured at 160° C. and a bias of 0.5 cN/tex and a minimum shrinkage force of 0.20 cN/tex, measured in accordance with DIN 53866 at 160° C. With such a low-shrinkage yarn, it becomes possible for instance to produce and successfully process large cylindrical stretch-spun wound packages of 5 to 15 kg each. The fabric is produced in a known manner by linen binding or ripstop binding and treated in a closed container at a temperature of 80° to 160° C. and a relative humidity of 90 to 100%.

The invention will be described in further detail in terms of examples.

EXAMPLE 1

A polyamide 6.6 filament with a titer of dtex 350 f104 Z60 with a thermal shrinkage of 5.5%, measured at 160° C. at a biasing force of 0.5 cN/tex, a thermal shrinkage force of 90 cN, or in other words 0.25 cN/tex, measured at 160° C. at a biasing force of 0.5 cN/tex, and a boiling shrinkage of 6.7%, a linen fabric was produced. The fabric was then treated in a chamber with saturated steam at temperatures above 100° C. and then dried and fixed on a tentering frame.

The fabric has the following properties:

|  | Warp | Weft |
|---|---|---|
| Yarn per centimeter | 28 | 24 |
| Tear strength N/5 cm | 2900 | 2700 |
| Residual boiling shrinkage (%) | 1.4 | 1.5 |
| Tear propagation strength (N) | 115 | 110 |
| Elongation to rupture (%) | 37 | 28 |
| Weight of the fabric | 215 g/m² | |
| Air permeability in the fabric | 2.55 l/dm²/min | |

EXAMPLE 2

A polyamide 6.6 filament with a titer of dtex 470 f68 Z60 with otherwise the same properties of example 1 was produced under the same conditions.

The fabric has the following properties:

|  | Warp | Weft |
|---|---|---|
| Yarn per centimeter | 23 | 22 |
| Tear strength N/5 cm | 3400 | 3550 |
| Residual boiling shrinkage (%) | 1.7 | 1.7 |
| Tear propagation strength (N) | 174 | 177 |
| Elongation to rupture (%) | 41 | 28 |
| Weight of the fabric | 245 g/m² | |
| Air permeability in the fabric | 2.45 l/dm²/min | |

EXAMPLE 3

A polyamide 6.6 filament with a titer of dtex 470 f68 Z0.00 with otherwise the same properties of example 1 was produced under the same conditions.

The fabric has the following properties:

|  | Warp | Weft |
|---|---|---|
| Yarn per centimeter | 24 | 21 |
| Tear strength N/5 cm | 3500 | 3100 |
| Residual boiling shrinkage (%) | 1.5 | 0 |
| Tear propagation strength (N) | 171 | 171 |
| Elongation to rupture (%) | 35 | 34.5 |
| Weight of the fabric | 245 g/m$^2$ | |
| Air permeability in the fabric | 3.0 l/dm$^2$/min | |

It can be seen from the examples that with the process according to the invention it has been possible for the first time to obtain even a in combination thermal shrinkage of <6% and a shrinkage force of >0.20 cN/tex, air permeabilities of less than 3 l/dm$^2$/min.

We claim:

1. An uncoated fabric with linen or ripstop binding of a polyamide filament yarn with a fibril titer of 1.5 to 7 dtex, a strength of 50 to 80 cN/tex and an elongation of 15 to 30%, for producing an impact gas bag (airbag), characterized in that the fabric simultaneously has an air permeability of <1/dm$^2$/min, a residual boiling shrinkage of <2%, and a tear propagation strength in warp and weft of >110N.

2. The uncoated fabric of claim 1, characterized in that the fabric, in the 5 cm fabric test strip, has a tear strength of >2500N.

3. A process for producing an uncoated fabric with linen or ripstop bonding of a polyamide filament, produced by a stretch-spinning process, with a fibril titer of 1.5 to 7 dtex for impact gas bags (airbags), characterized in that the polyamide filament has a hot air shrinkage of <6%, measured at a bias of 0.5 cN/tex and 160° C. in air, and a minimum shrinkage force of 0.20 cN/tex, and the fabric is treated in a closed container at a temperature of 80° to 160° C. and a relative humidity of 90 to 100%.

* * * * *